Patented Feb. 19, 1952

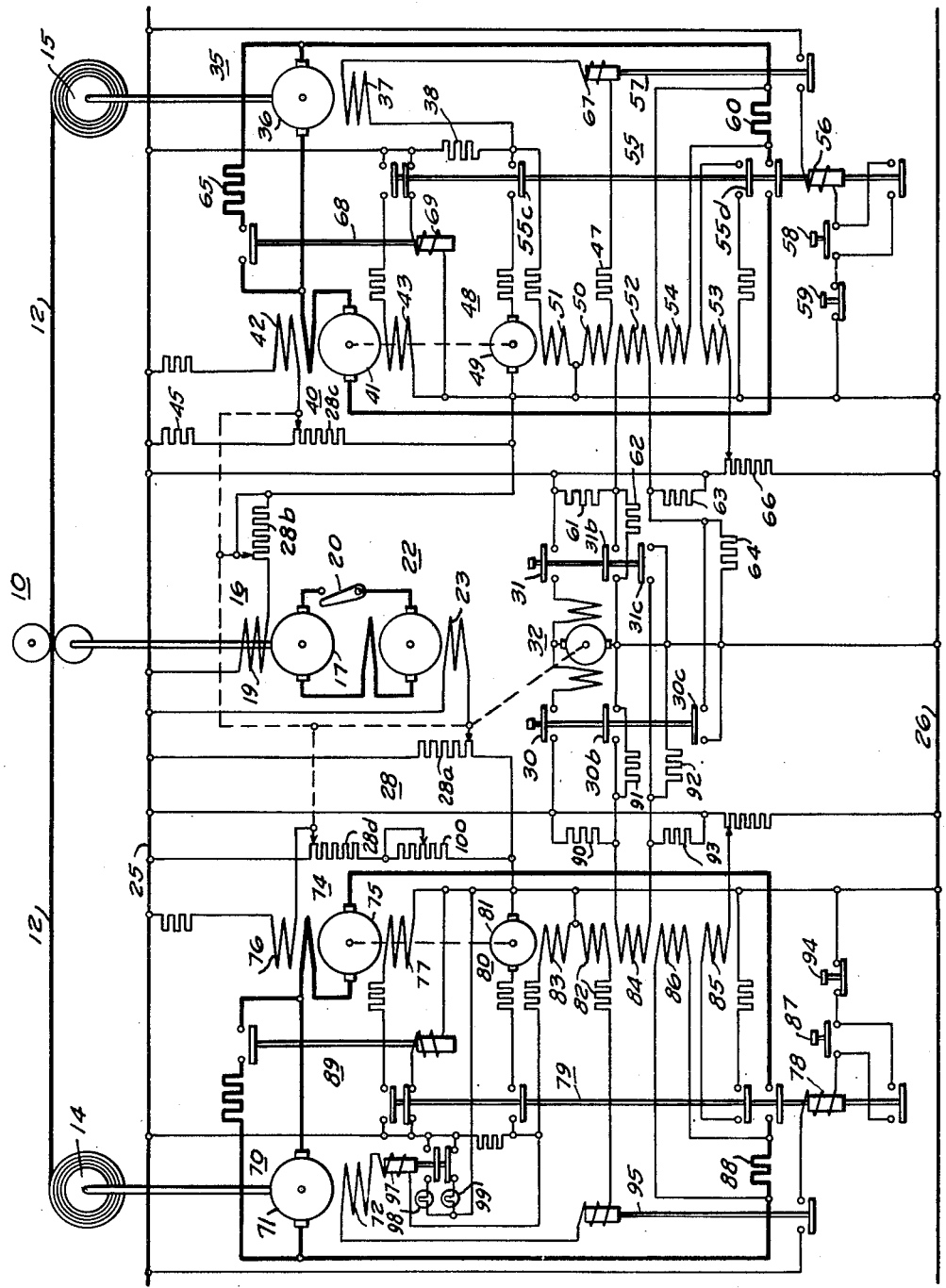

2,586,412

UNITED STATES PATENT OFFICE 2,586,412

CONTROL SYSTEM FOR DYNAMOELECTRIC MACHINES

Amos J. Winchester, Jr., Pittsburgh, Pa., assignor to Westinghouse Electric Corporation, East Pittsburgh, Pa., a corporation of Pennsylvania Application June 19, 1948, Serial No. 34,029

11 Claims. (Cl. 318—6)

My invention relates generally to control systems for dynamo-electric machines, and it has reference in particular to control systems for drag generators and reel motors such as may be used with entry and delivery reels in strip mills and the like.

Generally stated, it is an object of my invention to provide a reel control system that is simple and inexpensive to manufacture and is reliable and effective in operation.

More specifically, it is an object of my invention to provide, in a reel control system, for using a dynamo-electric machine having a single field winding the excitation of which may be regulated by a regulating generator to control the winding or unwinding of a strip of material.

Another object of my invention is to provide, in a reel control system, for using a single regulating generator for controlling the operation of a dynamo-electric machine which is connected in driving relation with the reel without employing a rectifier in the field circuit of the dynamo-electric machine.

Yet another object of my invention is to provide, in a reel control system, for using a common regulating generator to control the operation of both a dynamo-electric machine connected in driving relation with the reel, and a dynamo-electric machine connected in circuit relation with the dynamo-electric machine.

It is also an object of my invention to provide, in a reel control system, for utilizing a single regulating generator for regulating the tension of a strip of material both during operating conditions and when the mill is stalled.

An important object of my invention is to provide a reel control system utilizing but a single regulating generator for regulating the operation of either an entry reel drag generator or a delivery reel motor.

Other objects will in part be obvious, and will in part be explained hereinafter.

In practicing my invention in one of its forms the armature of a delivery reel motor is supplied with electrical energy from a main generator having both a main field winding, the energization of which is controlled by the mill rheostat, and an auxiliary field winding. The reel motor is provided with a field winding energized from an exciter bus. A regulating generator of the self energizing type is provided for cumulatively varying the excitation of the reel motor field winding in accordance with the armature current of the reel motor for regulating the strip tension. The auxiliary field winding of the main generator is energized from the regulating generator differentially with respect to the main field winding so as to provide for controlling the tension of the strip under stalled conditions.

For a more complete understanding of the nature and scope of my invention reference may be made to the following detailed description, which may be read in connection with the accompanying drawing, in which the single figure is a diagrammatic view of a single stand skin pass mill with entry and delivery reels utilizing the invention in different forms.

Referring to the drawing, the reference numeral 10 may denote generally the single roll stand of a skin pass mill wherein a strip of material 12 on an unwinding or entry reel 14 is passed through the roll stand 10 to a delivery or winding reel 15.

The single roll stand 10 may be driven by a mill motor 16 having an armature 17 and a field winding 19. The armature 17 may be supplied with electrical energy through a suitable switch 20 from a main generator 22 having a field winding 23, which may be connected to the conductors 25 and 26 of an exciter bus through one section 28a of a main mill rheostat 28.

The field winding 19 of the mill motor 16 may be connected to the conductors 25 and 26 through a second section 28b of the mill rheostat. The speed of the mill may be varied by means of "raise" and "lower" push button switches 30 and 31, which may be disposed to effect selective operation of a motor 32 connected in driving relation with the mill rheostat 28.

The delivery reel 15 may be connected in driving relation with a reel motor 35 having an armature 36 and a single field winding 37 which may be connected to the conductors 25 and 26 through a current limiting resistor 38. The armature 36 may be supplied with electrical energy from a main delivery reel generator 40 having an armature 41, a main field winding 42 and an auxiliary field winding 43. The main field winding 42 may be connected to the exciter bus conductors 25 and 26 through a section 28c of the mill rheostat. A resistor 45 may be connected in circuit relation with the section 28c of the mill rheostat so as to provide a bias voltage on the main field winding 42 when the mill rheostat is operated to its minimum position, in which the mill will be stalled.

In order to provide for controlling the operation of the reel motor 35 and regulating the tension of the strip 12 as it is wound on the reel 15, means such as the regulating generator 48 may be provided for varying the energization of the field winding 37. The regulating generator may comprise an armature 49 having a series type self energizing field winding 50, an anti-hunt field winding 51, an inertia compensating field winding 52, a pattern field winding 53 and a control field winding 54.

The self energizing field winding 50 may be connected in series circuit relation with the armature 49, a calibrating resistor 47 and the field winding 37 of the reel motor through contact members 55c of a control switch 55 having an operating winding 56, the energization of which may be controlled by "start" and "stop" tension push button switches 58 and 59. The anti-hunt field winding 51 may be connected in shunt circuit relation with the armature 49.

The inertia compensating field winding 52 may be connected across a bridge circuit of resistors 61, 62, 63, and 64. Contact members 31b of the "lower" push button switch 31 may be utilized to shunt resistor 62 so as to effect energization of the field winding 52 in such a direction as to increase the net excitation when the mill is slowing down. Contact members 30c of the "raise" push button switch 30 may be utilized to shunt resistor 64 so as to effect energization of the field winding 52 in the opposite sense when the mill is accelerating, whereby the inertia effects of the strip on the reel and other rotating parts of the system may be compensated for and the tension of the strip maintained at a more even value.

The pattern field winding 53 may be energized from the exciter bus conductors 25 and 26 through a suitable rheostat 66 and contact members 55d for determining the tension to be maintained in the strip 12. The control field winding 54 may be energized in accordance with the armature current of the reel motor 35 being, for example, connected in shunt circuit relation with a resistor or suitable shunt 60 connected in the armature circuit of the reel motor. The pattern field winding 53 may be connected so as to tend to reverse the output voltage of the regulating generator from its normal operating value. The control field winding 54 may be connected in the opposite sense so as to tend to increase the output voltage of the regulating generator with an increase in the armature current of the reel motor.

A field loss relay 57 having an operating winding 67 may be provided for deenergizing the operating winding 56 of the control switch 55 in the event that the current through the field winding 37 of the reel motor should fall below a safe value. A dynamic braking relay 68 having an operating winding 69 may be provided for connecting a braking resistor 65 across the armature 36 of the reel motor 35 when the control switch is deenergized.

The entry reel 14 may be provided with a drag generator 70 having an armature 71 and a single field winding 72. A main entry reel generator 74 having an armature 75 and main and auxiliary field windings 76 and 77 may be utilized for supplying electrical energy to the armature 71 of the drag generator. The main field winding 76 of the generator 74 may be energized from the exciter bus conductors 25 and 26 through another section 28d of the mill rheostat 28.

A regulating generator 80 may be provided for jointly controlling the excitation of the auxiliary field winding 77 of the regulating generator and the field winding 72 of the reel motor. The regulating generator 80 may comprise an armature 81, a self energizing field winding 82 of the series type, an anti-hunt field winding 83, an inertia compensating field winding 84, a pattern field winding 85 and a control field winding 86.

The regulating generator 80 may be substantially similar to the regulating generator 48 used in connection with the delivery reel motor 35, except that the pattern field winding 85 is connected to the exciter bus conductors 25 and 26 so as to provide for normally raising the output voltage of the regulating generator.

The control field winding 86 may be energized in accordance with the drop across a resistor or suitable shunt 88 in the armature circuit of the drag generator. The control field winding 86 may be connected in opposition to the pattern field winding 85.

The inertia compensating field winding 84 may be connected across a bridge circuit of resistors 90, 91, 92 and 93 in conjunction with contact members 30b and 31c of the "raise" and "lower" push button switches 30 and 31 so as to provide for decreasing the net pattern field when the mill is accelerating, and increasing it when the mill is decelerating.

In order to limit the speed of the drag generator should the strip break, a field loss relay 95 may be provided for interrupting the armature circuit of the drag generator in the event of a loss of field. The field loss relay may be connected to interrupt the energizing circuit of the operating winding 78 of a control switch 79 similar to the control switch 55. "Start" and "stop" tension push button switches 87 and 94 may be provided to effect operation of the control switch 79. A dynamic braking relay 89 may be utilized to complete a braking circuit for the armature 71 of drag generator 70.

In order to provide for compensating for draft, a current responsive draft relay 97 may be provided in series circuit relation with the field winding 72 of the drag generator. Red and green indicating lamps 98 and 99 may be provided in connection with the draft indicating relay for indicating when the regulating generator 80 has increased the field current of the drag generator to a dangerously high value in order to maintain strip tension when the draft or reduction of the strip 12 in the mill stand 10 is at higher than a predetermined value.

A draft compensating rheostat 100 may be provided in connection with the main field winding 76 of the generator 74 for reducing the output voltage of this generator so as to permit the regulating generator 80 to maintain the desired value of strip tension with a lower value of field current in the field winding 72.

In operation, the strip 12 may be fed in any suitable manner through the roll stand 10, which may then be operated slowly or "jogged" so as to advance the strip until it may be secured to the reel 15. The switches 87, 20 and 58 may then be closed and the mill started. The rheostat motor 32 may then be operated by means of the "raise" push button switch 30 so as to increase the speed of the mill. During acceleration the inertia compensating field winding 52 of the delivery reel regulating generator 48 will be cumulative with respect to the pattern field winding 53 so that the regulating generator 48 may function to maintain greater than the normal value of armature current in order to compensate for inertia, and maintain a predetermined value of strip tension. At the same time the inertia compensating field winding 84 of the entry reel regulating generator 80 will be differential with respect to the pattern field winding 85. Accordingly the regulating generator 80 will regulate for less than the normal value of armature current in the armature circuit of the drag generator 70, so that the mill may be accelerated without exceeding the desired tension in the strip 12.

As the strip unwinds from the entry reel 14 the reel speed increases due to the reduced diameter of the coil. Accordingly, the drag generator voltage increases and a greater current flows through the armature 75. This decreases the output voltage of the regulating generator 80 and reduces the excitation of the drag generator field winding 71, thus restoring the armature current and strip tension to the desired value. At the same time the speed of the delivery reel 15 decreases, so that the counter E. M. F. of the reel motor 35 is reduced and its armature current increases, resulting in increased strip tension. This increases the output voltage of the regulating generator 48 and increases the field excitation of the reel motor. The counter E. M. F. of the reel motor is restored and the armature current and strip tension are thereby returned to the desired normal value.

During running the regulating generator 48 will increase its output voltage as the armature current of the reel motor 35 exceeds a predetermined value. Accordingly, the energization of the field winding 37 of the reel motor will be increased over and above that which it receives from the exciter bus conductors 25 and 26. The reel motor thereupon tends to slow down, thus reducing the tension of the strip 12 to the predetermined value for which the rheostat 66 inserted in circuit relation with the pattern field winding 53 may be adjusted. At the same time the net excitation of the delivery reel main generator 40 will be reduced by reason of the differential action of the auxiliary field winding 43. This assists in reducing the armature current of the delivery reel motor 35.

Should the tension of the strip 12 increase on the entry reel side of the roll stand 10, the armature current of the drag generator 70 will increase. The net excitation of the regulating generator 80 therefore decreases, so that the output voltage of the regulating generator will be reduced, and the net excitation of the field winding 72 of the drag generator will be reduced. This tends to reduce the drag exerted by the generator on the strip 12 thereby restoring the tension of the strip to its normal or desired value. This effect of the regulating generator on the drag generator will be further enhanced by the reduction in the excitation of the field winding 71 of the generator 74.

Since this field winding is differential with respect to the main field winding 56 the net excitation of the generator 74 will be increased. An increase in the output voltage of the generator 74 limits the current generated by the drag generator 70, thus further tending to reduce the tension in the strip 12 so as to restore it to the desired value. Should the tension on the strip 12 decrease, the regulating generator output voltage will accordingly increase and the current in the armature circuit of the drag generator 70 will thereby be increased so as to restore the strip tension to the desired value.

When the mill is slowed down to the "stalled" condition, the mill rheostat 28 will be operated to its minimum operating position. In this position the excitation of the main field winding 42 of the generator 40 will be reduced to a minimum or bias value as determined by the resistor 45. Under "stalled" operating conditions the regulating generator 48 operates to maintain strip tension by varying the excitation of the auxiliary field winding 43 of the generator 40 and the excitation of the field winding 37 of the reel motor 35. The bias voltage on the main field winding 42 prevents the regulating generator output voltage from reversing, since it maintains a circulating current through the armature and self energizing field winding.

When the stalled motor armature current is higher than the desired value the output voltage of the regulating generator 48 will be increased. Since the auxiliary field winding 43 is differential with respect to the main field winding 42 this reduces the net excitation on the generator 40 so that its voltage and consequently the current circulating through the armature 36 of the reel motor is reduced. When the armature current drops below the desired value the output voltage of the regulating generator 48 will be reduced, so that the net excitation of the generator 40 will be increased to restore the armature current to a desired value.

Under stalled conditions the excitation of the main field winding 76 of the generator 74 will be reduced to substantially zero. The regulating generator 80 which controls the excitation of the auxiliary field winding 77 will thereupon be effective to reverse the polarity of the generator 74, so that the drag generator 70 may operate as a motor to maintain the tension of the strip 12. Should the tension of the strip 12 be too high, the control field winding 86 will predominate, and the output voltage of the regulating generator 80 will be reduced.

Accordingly, the output voltage of the generator 74 will be reduced so as to limit the current in the armature circuit of the drag generator 70, and restore the tension of the strip 12 to the desired value. At the same time that the excitation of the auxiliary field winding 77 is reduced, the excitation of the field winding 72 will be reduced also by reason of the reduction in the output voltage of regulating generator 80. This further tends to reduce the torque of the motor 14 and assist in restoring the desired strip tension.

So long as the amount of the draft in the roll stand 10 does not exceed a predetermined value, the regulating generator 80 will not be required to increase the excitation of the motor field winding 72 beyond a safe value in attempting to maintain the tension of the strip 12. Should the operator, however, attempt to make too high a reduction in the thickness of the strip 12, the reduction in entry speed of the strip 12 would call for the regulating generator 80 to increase the excitation of the field winding 72 to what may reach a dangerously high value. Under such conditions the draft relay 97 becomes effective. When the current in the field winding 72 exceeds a safe upper limit the relay operates, extinguishing the green lamp 99 and lighting the red lamp 98, so as to indicate to the operator that the drag generator has an excessively high value of field current. In response to this indication the operator may adjust the draft compensating rheostat 100 so as to reduce the output voltage of the generator 74 and permit the drag generator 70 to maintain the necessary value of armature current with a reduced amount of field excitation.

Should the strip break, the regulating generator 48 may try to reverse the direction of the field current of the reel motor field winding 37. Under this condition the field loss relay 67 returns to the deenergized position and deenergizes the operating winding 56 of the control switch 55. The delivery reel system is thereupon effectively deenergized.

From the above description and the accompanying drawing it will be apparent that I have provided, in a simple and effective manner, for controlling the operation of both drag generators and reel motors such as are used with entry and delivery reels, respectively. By utilizing a single regulating generator in each instance, a flexible and uniform reel control system is provided which may be readily adapted for use with either entry or delivery reels. The amount of control equipment required for maintaining a desired strip tension is greatly reduced, so that the expense of installing and maintaining the equipment will be reduced accordingly.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. A control system comprising, a dynamo-electric machine having an armature and having a field winding, an additional dynamo-electric machine having an armature connected in electrical energy transferring relation with the armature of the first mentioned dynamo-electric machine, and having a field winding, circuit means connecting the field winding of the additional dynamo-electric machine to a source of substantially constant voltage a regulating generator of the self-energizing type connected to respond to the armature current of the first mentioned dynamo-electric machine, and circuit means connecting said regulating generator in circuit relation with the field windings of both dynamo-electric machines to energize the field winding of the first mentioned dynamo-electric machine and to energize the field winding of the additional dynamo-electric machine cumulatively with the source, to regulate operation of both dynamo-electric machines.

2. In a reel control system, a dynamo-electric machine having a field winding, an additional dynamo-electric machine connected in electrical energy transferring relation with the first mentioned machine and having a field winding, circuit means connecting the field winding of the first-mentioned dynamo-electric machine to a constant voltage source, a regulating generator responsive to the load on said first mentioned dynamo-electric machine, and circuit means connecting the regulating generator to supply excitation to both of the dynamo-electric machines, said regulating generator being connected in cumulative shunt relation with the source and the field winding of the first-mentioned machine.

3. In a control system for a dynamo-electric machine having a driving connection with an adjacent work device, said dynamo-electric machine having an armature and a field winding, an additional dynamo-electric machine having an armature connected in series circuit relation with the armature of the first mentioned machine and a plurality of field windings, circuit means connecting one of said plurality of field windings for energization in accordance with the speed of the adjacent work device, additional circuit means connecting the field winding of the first mentioned machine to a source of control voltage, and a regulating generator responsive to the armature current of the first mentioned machine connected to supply excitation to another of the field windings of the additional dynamo-electric machine and to said field winding of the first mentioned machine.

4. A control system for a dynamo-electric machine having an armature connected in driving relation with an adjacent work device and a field winding disposed to be connected to a source of control voltage, an additional dynamo-electric machine having an armature connected in series circuit relation with the armature of the first mentioned machine and main and auxiliary field windings, circuit means connecting the main field winding to the source of control voltage including a rheostat operable in accordance with speed control means varying the speed of the work device, and a regulating generator connected to control energization of the auxiliary field winding of the additional machine and the field winding of the first mentioned machine, said regulating generator having a pattern field winding energized from the source of control voltage and an opposed control field winding energized in accordance with the armature current of the first mentioned machine.

5. In a control system, a motor having field excitation means disposed to be connected to a source of control voltage, a main generator connected to supply electrical energy to the motor, said main generator having a main field winding energized from the source of control voltage and an auxiliary field winding, and a regulating generator responsive to the load on the motor, said regulating generator being connected to effect cumulative excitation of the motor field excitation means and differential excitation of the auxiliary field winding of the main generator.

6. A control system for a motor having a field winding connected to a source of control voltage and an armature, a main generator connected to supply electrical energy to the motor armature, said generator having a main field winding energized in accordance with a speed condition related to said motor and an auxiliary field winding, and a regulating generator connected to effect energization of the motor field winding cumulatively with respect to the source of control voltage and energization of the auxiliary field winding differentially with respect to the main field winding of the main generator.

7. In a control system for a motor having an armature and a field winding connected to a source of control voltage; a main generator having a main field winding energized from the source of control voltage in accordance with a predetermined speed condition, an auxiliary field winding, and an armature connected to supply electrical energy to the armature of the motor; and a regulating generator connected to energize the motor field winding cumulatively with respect to the source and the auxiliary field winding differentially with respect to said main field winding, said regulating generator having a control field winding energized in accordance with the armature current of the motor to increase the output voltage of the regulating generator with an increase of said armature current, and a pattern field winding energized from the source in opposed relation to the control field winding.

8. In a control system for a drag generator having a field winding disposed to be connected to a source of control voltage and an armature, a main generator having an armature connected in circuit relation with the drag generator armature and having main and auxiliary field windings, circuit means connecting said main field winding to a source of control voltage for energization in accordance with a speed condition related to the speed of the drag generator, and a regulating generator operable to decrease its output voltage with an increase of drag generator armature current, said regulating generator being connected to energize the drag generator field winding cumulatively with respect to the source and the auxiliary field winding differentially with respect to the main field winding of the main generator.

9. In a control system for a drag generator having a field winding connected to a source of control voltage and an armature, a main generator having a field winding and an armature connected in circuit relation with the drag generator armature, a regulating generator, and circuit means connecting the regulating generator in shunt circuit relation with the main generator and drag generator field windings to supply excitation to the drag and main generator field windings, said regulating generator having a pattern field winding energized from the source of control voltage and a control field winding energized in accordance with the drag generator current in differential relation with the pattern field winding.

10. In a control system, a drag generator, a main generator connected in circuit relation with the drag generator, a regulating generator responsive to the armature current of the drag generator, circuit means connecting the regulating generator to supply excitation to the drag and main generators so as to regulate for a substantially constant value of armature current between the main and drag generator, and control means operable in response to the amount of drag generator field excitation to indicate when the drag generator field current exceeds a predetermined value, which occurs when the torque of the drag generator exceeds a predetermined value.

11. In a control system for a drag generator having a field winding and an armature, a main generator having an armature connected in circuit relation with the drag generator armature and having main and auxiliary field windings, circuit means connecting the main field winding to a source of control voltage including a rheostat operable in accordance with predetermined speed condition, a draft rheostat connected in circuit relation with the main field winding, a regulating generator responsive to the drag generator armature current operable to supply excitation to the drag generator field winding and the main generator auxiliary field winding to maintain a predetermined tension, and control means responsive to the excitation of the drag generator field winding operable to indicate an excessive torque condition of the drag generator.

AMOS J. WINCHESTER, Jr.

REFERENCES CITED

The following references are of record in the file of this patent:

UNITED STATES PATENTS

| Number | Name | Date |
|---|---|---|
| 2,264,277 | Cook | Dec. 2, 1941 |
| 2,339,939 | Michel | Jan. 25, 1944 |
| 2,342,790 | Cook | Feb. 29, 1944 |
| 2,385,669 | Whiting | Sept. 25, 1945 |
| 2,437,973 | Schmitz | Mar. 16, 1948 |
| 2,444,248 | Crever | June 29, 1948 |
| 2,447,654 | Kenyon | Aug. 24, 1948 |
| 2,451,901 | Auburn | Oct. 19, 1948 |
| 2,456,950 | King | Dec. 21, 1948 |